US012692164B2

(12) United States Patent
Fan et al.

(10) Patent No.: US 12,692,164 B2
(45) Date of Patent: Jul. 28, 2026

(54) METHOD OF PREPARING HARD CARBON ANODE MATERIAL AND USE THEREOF

(71) Applicants: YICHANG BRUNP RECYCLING TECHNOLOGY CO., LTD., Yichang (CN); YICHANG BRUNP CONTEMPORARY AMPEREX CO., LTD., Yichang (CN); GUANGDONG BRUNP RECYCLING TECHNOLOGY CO., LTD., Foshan (CN); HUNAN BRUNP RECYCLING TECHNOLOGY CO., LTD., Changsha (CN)

(72) Inventors: Xia Fan, Foshan (CN); Changdong Li, Foshan (CN); Maohua Feng, Foshan (CN); Shuang Zheng, Foshan (CN); Linlin Mao, Foshan (CN); Dingshan Ruan, Foshan (CN)

(73) Assignees: YICHANG BRUNP RECYCLING TECHNOLOGY CO., LTD., Yichang (CN); YICHANG BRUNP CONTEMPORARY AMPEREX CO., LTD., Yichang (CN); GUANGDONG BRUNP RECYCLING TECHNOLOGY CO., LTD., Foshan (CN); HUNAN BRUNP RECYCLING TECHNOLOGY CO., LTD., Changsha (CN)

( * ) Notice: Subject to any disclaimer, the term of this patent is extended or adjusted under 35 U.S.C. 154(b) by 526 days.

(21) Appl. No.: 18/282,723

(22) PCT Filed: Sep. 9, 2022

(86) PCT No.: PCT/CN2022/118011
§ 371 (c)(1),
(2) Date: Sep. 18, 2023

(87) PCT Pub. No.: WO2024/000817
PCT Pub. Date: Jan. 4, 2024

(65) Prior Publication Data
US 2025/0033977 A1 Jan. 30, 2025

(30) Foreign Application Priority Data
Jun. 29, 2022 (CN) .......................... 202210751507.5

(51) Int. Cl.
*C01B 32/00* (2017.01)
*C01B 32/318* (2017.01)
(Continued)

(52) U.S. Cl.
CPC ......... *C01B 32/318* (2017.08); *H01M 4/0471* (2013.01); *C01P 2002/72* (2013.01);
(Continued)

(58) Field of Classification Search
None
See application file for complete search history.

(56) References Cited

U.S. PATENT DOCUMENTS

2002/0192553 A1* 12/2002 Barker ................ H01M 4/5815
429/231.9
2019/0221835 A1 7/2019 Imaji et al.
2019/0260012 A1* 8/2019 Zhang ..................... C01B 32/15

FOREIGN PATENT DOCUMENTS

CN 102364727 A 2/2012
CN 103078092 A 5/2013
(Continued)

OTHER PUBLICATIONS

The Moroccan 1st Office Action issued on Nov. 29, 2024 for MA62184.
(Continued)

*Primary Examiner* — Stefanie J Cohen
(74) *Attorney, Agent, or Firm* — Yue (Roberts) Xu; Apex Attorneys at Law, LLP

(57) ABSTRACT

The present invention discloses a method of preparing a hard carbon anode material and use thereof. Starch is mixed with
(Continued)

nano-silica, the obtained mixture is heat treated at 150° C. to 240° C. under an inert atmosphere, the obtained first-sintered product is heat treated at 180° C. to 220° C. under an oxygen-containing atmosphere, the second-sintered product is cyclonically separated to remove nano-silica to obtain pre-oxidized starch-based microspheres, and the pre-oxidized starch-based microspheres are performed carbonization treatment under an inert atmosphere to obtain the hard carbon anode material. In the present invention, the silica particles can be adsorbed on the surface of the starch raw material, and cross-linking occurs between the starch molecular chains during the heat treatment process, and under the barrier of the silicon dioxide, the starch particles will not be cross-linked but fused to form a spherical structure. The introduction of oxygen atoms during the pre-oxidation process produces oxygen vacancy and increases the active sites for sodium ion storage after carbonization, thus increasing the reversible capacity of sodium ion batteries.

9 Claims, 2 Drawing Sheets

(51) Int. Cl.

| | | |
|---|---|---|
| *H01M 4/04* | (2006.01) | |
| *H01M 4/02* | (2006.01) | |
| *H01M 4/587* | (2010.01) | |
| *H01M 10/054* | (2010.01) | |

(52) U.S. Cl.

CPC ...... *C01P 2004/03* (2013.01); *C01P 2004/61* (2013.01); *C01P 2006/12* (2013.01); *C01P 2006/40* (2013.01); *H01M 2004/021* (2013.01); *H01M 4/587* (2013.01); *H01M 10/054* (2013.01)

(56) References Cited

FOREIGN PATENT DOCUMENTS

| | | | |
|---|---|---|---|
| CN | 103647082 | A | 3/2014 |
| CN | 103996833 | A | 8/2014 |
| CN | 104518226 | A | 4/2015 |
| CN | 106299265 | A | 1/2017 |
| CN | 107706417 | A | 2/2018 |
| CN | 110034285 | A | 7/2019 |
| CN | 113620272 | A | 11/2021 |
| CN | 114275760 | A | 4/2022 |
| CN | 114436237 | A | 5/2022 |
| CN | 114988391 | A | 9/2022 |
| JP | 2004220972 | A | 8/2004 |
| JP | 2017107856 | A | 6/2017 |

OTHER PUBLICATIONS

The Spanish Search Report issued on Jul. 11, 2025 for P202390121. International Search Report for PCT/CN2022/118011 issued on Dec. 22, 2022.

* cited by examiner

METHOD OF PREPARING HARD CARBON ANODE MATERIAL AND USE THEREOF

The present application is the national phase of International Application No. PCT/CN2022/118011, titled "METHOD OF PREPARING HARD CARBON ANODE MATERIAL AND USE THEREOF", which claims the priority to Chinese Patent Application No. 202210751507.5, titled "METHOD OF PREPARING HARD CARBON ANODE MATERIAL AND USE THEREOF", filed on Jun. 29, 2022 with the Chinese Patent Office, the entire disclosures thereof are incorporated herein by reference.

FIELD

The present application relates to the technical field of anode materials for batteries, in particular to a method of preparing a hard carbon anode material and use of the same.

BACKGROUND

With the rapid development of mobile electronic devices, grid energy storage and electric vehicles, Li-ion batteries have occupied a central position in the new energy market. Although lithium-ion batteries (LiBs) are currently the most compatible requirements with practical application, the nascent sodium-ion batteries (SiBs) are gradually becoming a solution to replace lithium-ion batteries, considering the scarcity and limitation of lithium resources. Sodium and lithium have similar physicochemical properties, and sodium is highly abundant in nature and the price is inexpensive. In summary, sodium is currently the most desirable element to replace lithium in rechargeable batteries for energy storage systems, and advanced electrode materials are the key to developing sodium ion batteries.

In the past few years, many excellent positive electrode materials for SiBs, such as layered transition metal oxides, polyphosphate compounds and Prussian blue analogues, have been developed. However, in terms of anode material selection, graphite anode used for commercialization of lithium-ion batteries are not sufficient for sodium storage. Therefore, the development of excellent anode materials has become the most serious challenge for applications of sodium ion battery. Among the most promising directions so far, hard carbon has sufficient sodium storage sites and has been identified as the preferred anode material for commercial sodium ion batteries (SiBs).

However, the hard carbon anode materials reported in the prior art still suffer from low first efficiency, low capacity, complex production process, and high production cost, which seriously limit the development and commercial application of sodium ion batteries.

SUMMARY

The purpose of the present application is to solve at least one of the technical problems of the prior art described above. To this end, the present application provides a method of preparing a hard carbon anode material and use of the same.

According to one aspect of the present application, a method of preparing a hard carbon anode material is provided, comprising the following steps:

S1: mixing starch with nano-silica, and performing heat treatment on the obtained mixture at 150° C. to 240° C. under an inert atmosphere to obtain a first-sintered product;

S2: performing heat treatment on the first-sintered product at 180° C. to 220° C. under an oxygen-containing atmosphere to obtain a second-sintered product;

S3: cyclonically separating the second-sintered product to remove the nano-silica, to obtain pre-oxidized starch-based microspheres; and S4: performing carbonization treatment on the pre-oxidized starch-based microspheres under an inert atmosphere to obtain the hard carbon anode material.

In some embodiments of the present application, in step S1, the starch has a particle size of 2 μm to 80 μm, and the nano-silica has a particle size of 5 nm to 50 nm. Further, the nano-silica may be fumed silica.

In some embodiments of the present application, in step S1, a mass ratio of the starch to the nano-silica is 100:(0.5-10).

In some embodiments of the present application, in step S1, the heat treatment is performed for 3 h to 20 h.

In some embodiments of the present application, in step S1, the temperature is raised to a target temperature of the heat treatment at a rate of 0.5° C./min to 15° C./min.

In some embodiments of the present application, the heat treatment in step S2 is: placing the first-sintered product in a reaction device, introducing oxygen-containing gas to purge for 30 min to 120 min, and then heating up to a target temperature for heat treatment. Further, the temperature is raised to the target temperature of the heat treatment at a rate of 0.5° C./min to 10° C./min.

In some embodiments of the present application, in step S2, the heat treatment is performed for 4 h to 24 h.

In some embodiments of the present application, in step S3, the pre-oxidized starch-based microspheres obtained after the cyclone separation are cyclonically separated again, and the cyclone separation is repeated 2 times to 8 times according to the above process.

In some embodiments of the present application, in step S4, the carbonization treatment is performed at a temperature of 1000° C. to 1600° C. Further, the temperature is raised to the target temperature of the carbonization treatment at a rate of 0.5° C./min to 10° C./min.

In some embodiments of the present application, in step S4, the carbonization treatment is: placing the pre-oxidized starch-based microspheres in a high-temperature carbonization furnace, introducing inert gas to purge for 30 min to 120 min, and then heating up to a target temperature for carbonization treatment.

In some embodiments of the present application, in step S4, the carbonization treatment is performed for 1 h to 5 h.

In some embodiments of the present application, the hard carbon anode material has a specific surface area of 2 m²/g to 4 m²/g and a particle size D50 of 5 μm to 10 μm.

The present application further provides use of the above preparation method in the preparation of sodium ion batteries.

According to a preferred embodiment of the present application, it has at least the following beneficial effects.

1. In the present application, by simply mixing starch with nano-silica, the silica particles can be easily adsorbed on the surface of the starch material, forming a structure similar to "micelles". During the heat treatment process, the hydrogen bond between the starch molecules breaks to form an ether bond, which results in cross-linking between the starch molecule chains, but under the barrier of silica, the starch particles do not cross-link and fuse, and the raw material molecules form a spherical structure with less surface energy through molecular rearrangement. On the contrary, if silica is not added, the pure starch raw material particles lack molecular interaction with silica particles, which makes the raw material molecules flow easily and fuse with other molecules, generating a pile-like product with less surface energy-foam carbon, which is easy to make the SEI film increase and lead to the problem of lower specific capacity and first efficiency.

2. In the present application, the raw material is pre-oxidized, and the C=O bond or C—O bond is generated during the pre-oxidation process, and the oxygen vacancies generated by the introduction of oxygen atoms after carbonization increase the active sites for sodium ion storage, thus increasing the reversible capacity of sodium ion batteries. In addition, there are some pores on the surface of the starch powder itself, and after pre-oxidation, the oxygen molecules involved in the reaction will fill some larger pores, thus reducing the defects and playing a repairing effect, and reducing the specific surface area of the hard carbon material.

3. In the present application, the pre-oxidized starch-based microspheres and silica are separated by a simple cyclone separation method, the separation process is simple and the separation effect is remarkable.

4. The present application has less process steps, simple process, low energy consumption, high degree of operation, and low production cost, which is friendly to the environment and suitable for large-scale production.

BRIEF DESCRIPTION OF THE DRAWINGS

The present application is further described below in conjunction with the accompanying drawings and examples.

DETAILED DESCRIPTION

The following will be a clear and complete description of the conception of the present application and the technical effects produced in conjunction with the examples, in order to fully understand the purpose, features and effects of the present application. Apparently, the described examples are only a part of the examples of the present application, not all of them. Based on the examples of the present application, other examples obtained by a person skilled in the art without creative labor fall within the scope of protection of the present application.

Example 1

A hard carbon anode material was prepared according to the present example, which comprised the following steps.

(1) Starch with a particle size of 2 μm to 80 μm and nano-silica (5 nm to 50 nm) were mixed at a mass ratio of 100:0.5 in a high-speed mixer for 5 minutes to obtain the mixed starch.

(2) The starch mixed with nano-silica obtained from step (1) was placed into a tube furnace and heated up to 220° C. at a heating rate of 5° C./min under the protection of $N_2$, thermostatically heat treated for 8 h, and cooled down to room temperature to obtain a first-sintered product.

(3) The starch-based microspheres obtained from step (2) were placed into a tube furnace, purged by introducing air for 30 min, and continued to be heated up to the target temperature of 200° C. at a heating rate of 5° C./min after 30 min of purging, thermostatically heat treated at the target temperature for 12 h, and cooled down to room temperature to obtain a second-sintered product mixed with nano-silica.

(4) The second-sintered product obtained from step (3) was separated through a cyclone separator to obtain silica and pre-oxidized starch-based microspheres, and the pre-oxidized starch-based microspheres were further separated by cyclone separation for 2 times to remove silica from the pre-oxidized starch-based microspheres, to obtain pre-oxidized starch-based microspheres with a purity of 99.7%.

(5) The pre-oxidized starch-based microspheres obtained in step (4) were placed into a high-temperature carbonization furnace, purged by introducing $N_2$ for 30 min, heated up to the target temperature of 1400° C. at a heating rate of 5° C./min, and thermostatically heat treated at the target temperature and under $N_2$ atmosphere for 2 h to remove the oxygen-containing functional groups and bound water in the material, in which the structure is further rearranged, and cooled down to room temperature to obtain the hard carbon anode material.

Figure 1:
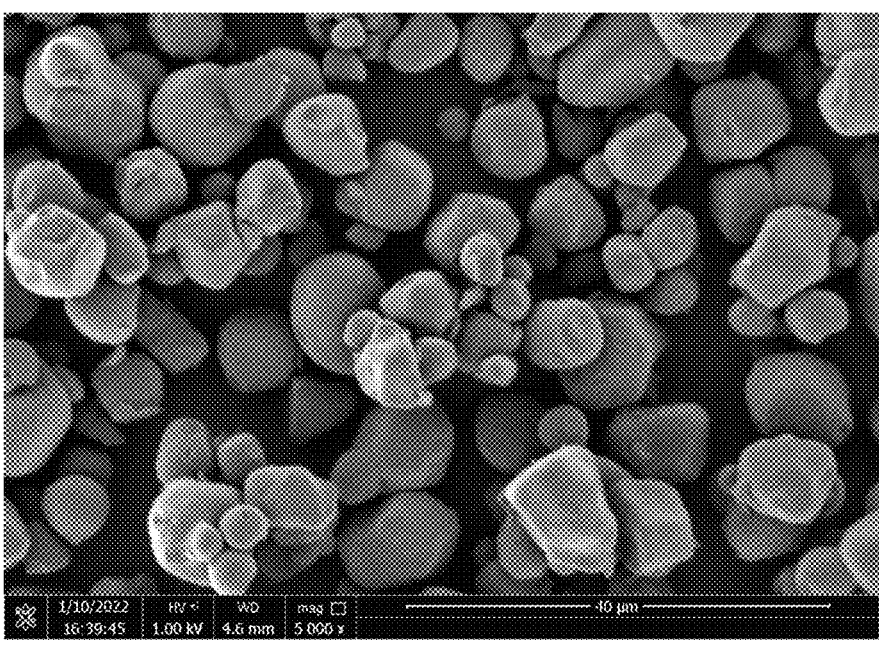
FIG. 1 is an SEM diagram of a hard carbon anode material prepared according to Example 1 of the present application.

FIG. 1 shows the SEM diagram of the hard carbon anode material prepared according to Example 1, from which it can be seen that the material morphology was spheroid particles with rounded edges.

Figure 2:
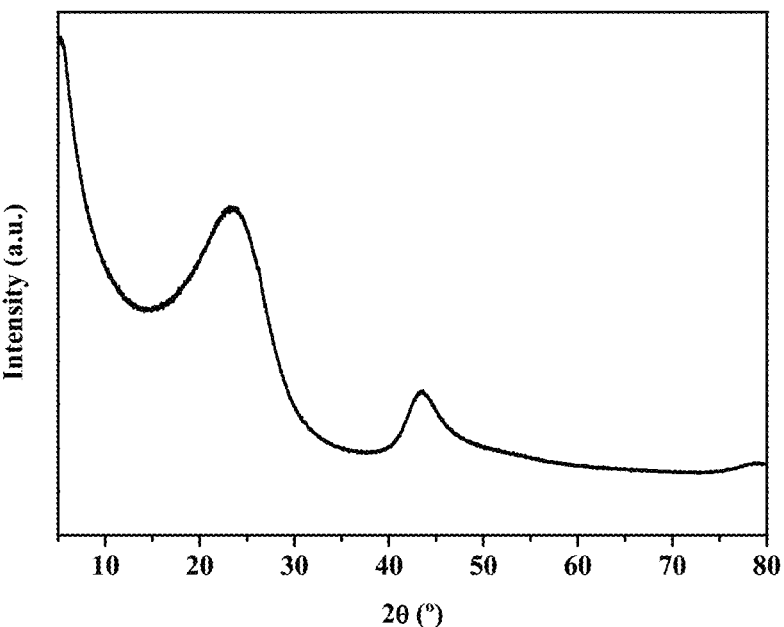
FIG. 2 is an XRD diagram of the hard carbon anode material prepared according to Example 1 of the present application.
Figure 3:
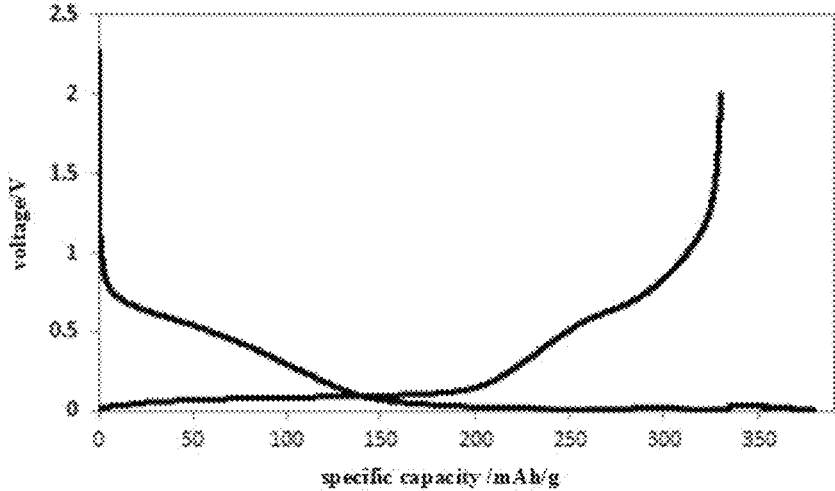
FIG. 3 is the charging and discharging curve of the hard carbon anode material prepared according to Example 1 of the present application.

FIG. 2 shows the XRD diagram of the hard carbon anode material prepared according to Example 1, from which it can be seen that about 24° was corresponding to the diffraction peak (002) crystal plane, the half-peak width was larger and the angle was smaller, indicating that the disorder of this hard carbon material was higher, and the calculated layer spacing d=0.37 nm was favorable for the storage and release of sodium ions.

Example 2

A hard carbon anode material was prepared according to the present example, which comprised the following steps.

(1) Starch with a particle size of 2 μm to 80 μm and nano-silica (5 nm to 50 nm) were mixed at a mass ratio of 100:1 in a high-speed mixer for 5 minutes to obtain the mixed starch.

(2) The starch mixed with nano-silica obtained from step (1) was placed into a tube furnace and heated up to 220° C. at a heating rate of 5° C./min under the protection of $N_2$, thermostatically heat treated for 8 h, and cooled down to room temperature to obtain a first-sintered product.

(3) The starch-based microspheres obtained from step (2) were placed into a tube furnace, purged by introducing air for 30 min, and continued to be heated up to the target temperature of 200° C. at a heating rate of 5° C./min after 30 min of purging, thermostatically heat treated at the target temperature for 12 h, and cooled down to room temperature to obtain a second-sintered product mixed with nano-silica.

(4) The second-sintered product obtained from step (3) was separated through a cyclone separator to obtain silica and pre-oxidized starch-based microspheres, and the pre-oxidized starch-based microspheres were further separated by cyclone separation for 4 times to remove silica from the pre-oxidized starch-based microspheres, to obtain pre-oxidized starch-based microspheres with a purity of 99.6%.

(5) The pre-oxidized starch-based microspheres obtained in step (4) were placed into a high-temperature carbonization furnace, purged by introducing $N_2$ for 30 min, heated up to the target temperature of 1400° C. at a heating rate of 5° C./min, and thermostatically heat treated at the target temperature and under $N_2$ atmosphere for 2 h, and cooled down to room temperature to obtain the hard carbon anode material.

Example 3

A hard carbon anode material was prepared according to the present example, which comprised the following steps.

(1) Starch with a particle size of 2 µm to 80 µm and nano-silica (5 nm to 50 nm) were mixed at a mass ratio of 100:3 in a high-speed mixer for 5 minutes to obtain the mixed starch.

(2) The starch mixed with nano-silica obtained from step (1) was placed into a tube furnace and heated up to 220° C. at a heating rate of 5° C./min under the protection of $N_2$, thermostatically heat treated for 8 h, and cooled down to room temperature to obtain a first-sintered product.

(3) The starch-based microspheres obtained from step (2) were placed into a tube furnace, purged by introducing air for 30 min, and continued to be heated up to the target temperature of 200° C. at a heating rate of 5° C./min after 30 min of purging, thermostatically heat treated at the target temperature for 12 h, and cooled down to room temperature to obtain the second-sintered product mixed with nano-silica.

(4) The second-sintered product obtained from step (3) was separated through a cyclone separator to obtain silica and pre-oxidized starch-based microspheres, and the pre-oxidized starch-based microspheres were further separated by cyclone separation for 6 times to remove silica from the pre-oxidized starch-based microspheres, to obtain pre-oxidized starch-based microspheres with a purity of 99.5%.

(5) The pre-oxidized starch-based microspheres obtained in step (4) were placed into a high-temperature carbonization furnace, purged by introducing $N_2$ for 30 min, heated up to the target temperature of 1400° C. at a heating rate of 5° C./min, and thermostatically heat treated at the target temperature and under $N_2$ atmosphere for 2 h, and cooled down to room temperature to obtain the hard carbon anode material.

Contrast Example 1

A hard carbon anode material was prepared according to the present contrast example, which differed from Example 1 in that no nano-silica was added. The specific process was as following.

(1) Starch with a particle size of 2 µm to 80 µm was taken as a raw material, placed into a tube furnace, heated up to 220° C. with a heating rate of 5° C./min under the protection of $N_2$, thermostatically heat treated for 8 h, and cooled down to room temperature to obtain a lumpy first-sintered material.

(2) The lumpy first-sintered material obtained from step (1) was crushed into particles of 4 µm to 7 µm, purged by introducing air for 30 min, and continued to be heated up to the target temperature of 200° C. at a heating rate of 5° C./min after 30 min of purging, thermostatically heat treated at the target temperature for 12 h, and cooled down to room temperature, to obtain the pre-oxidized lumpy second-sintered material.

(3) The pre-oxidized lumpy second-sintered material obtained from step (2) was crushed into particles of 4 µm to 7 µm, placed into a high-temperature carbonization furnace, purged by introducing $N_2$ for 30 min, heated up to the target temperature of 1400° C. at a heating rate of 5° C./min, and thermostatically heat treated at the target temperature and under $N_2$ atmosphere for 2 h, and cooled down to room temperature, to obtain the hard carbon anode material.

Contrast Example 2

A hard carbon anode material was prepared according to the present contrast example, which differed from Example 1 in that no pre-oxidation was carried out. The specific process was as following.

(1) Starch with a particle size of 2 µm to 80 µm and nano-silica (5 nm to 50 nm) were mixed at a mass ratio of 100:0.5 in a high-speed mixer for 5 minutes to obtain the mixed starch.

(2) The starch mixed with nano-silica obtained from step (1) was placed into a tube furnace and heated up to 220° C. at a heating rate of 5° C./min under the protection of $N_2$, thermostatically heat treated for 8 h, and cooled down to room temperature to obtain a first-sintered starch-based microspheres.

(3) The first-sintered starch-based microspheres obtained from step (2) were separated through a cyclone separator to obtain silica and starch-based microspheres, and the starch-based microspheres were further separated by cyclone separation for 2 times to remove silica from the starch-based microspheres, to obtain starch-based microspheres with a purity of 99.4%.

(4) The starch-based microspheres obtained in step (3) were placed into a high-temperature carbonization furnace, purged by introducing $N_2$ for 30 min, heated up to the target temperature of 1400° C. at a heating rate of 5° C./min, and thermostatically heat treated at the target temperature and under $N_2$ atmosphere for 2 h, and cooled down to room temperature to obtain the hard carbon anode material.

Physicochemical Properties

Table 1 shows the comparison of the specific surface area of the samples prepared according to Example 1, 2 and 3 and Contrast example 1 and 2. In Contrast example 1, no mixing with nano-silica was performed, the fusion between the material particles occurred during the first and second sintered process, thus producing lumpy carbon or even foam carbon. In order to prepare into a powder, the lumpy carbon or the foam carbon needs to be crushed repeatedly, and this will cause defects on the surface of the material particles during the crushing process, thus increasing the specific surface area. The difference between Contrast example 2 and Example 1 was that the starch-based microspheres after the first-sintered were not pre-oxidized and were directly carbonized at high temperature, and some defects of the powder were not repaired in the absence of pre-oxidation treatment, and the specific surface area of the corresponding finished product was larger than that of the pre-oxidized product.

TABLE 1

Particle size and specific surface area test data of the hard carbon anode materials according to the examples and the samples according to the contrast examples

| Sample | Particle size D50 (µm) | Specific surface area (m²/g) |
|---|---|---|
| Example 1 | 8.51 | 3.53 |
| Example 2 | 7.98 | 2.93 |
| Example 3 | 8.58 | 2.68 |
| Contrast example 1 | 5.25 | 11.27 |
| Contrast example 2 | 8.13 | 23.35 |

Test Example

The samples prepared according to Example 1, 2 and 3 and Contrast example 1 and 2 were respectively assembled into a button cell to test the electrochemical properties of the samples. The positive electrode of the cell was sodium flake, the anode of the cell was all active material, the ratio of the anode material was active material (90% by volume), acetylene black (5% by volume), polyvinylidene fluoride (5% by volume) (PVDF), [PVDF:NMP (N-methylpyrrolidone)=1:10, the solvent was a triple system of EC (ethylene carbonate), DMC (dimethyl vinyl carbonate) and EMC (methyl ethyl carbonate), the electrolyte was a solution with $LiPF_6$ concentration of 1 mol/L (where the volume ratio of EC, DMC and EMC was 1:1:1), and the button cell was prepared in a glove box filled with argon gas. The cell charge and discharge tests were performed on the LAND battery system with a charge and discharge voltage range of 0 to 2 V. The test results are shown in Table 2.

TABLE 2

Electrochemical performance test data of the hard carbon anode materials according to the examples and the samples according to the contrast examples

| Sample | 0.05C discharge specific capacity (mAh/g) | Coulomb efficiency (%) | Capacity retention of 200 cycles (%) |
| --- | --- | --- | --- |
| Example 1 | 329.3 | 86.75 | 91 |
| Example 2 | 326.8 | 86.23 | 91 |
| Example 3 | 323.7 | 85.94 | 90 |
| Contrast example 1 | 313.3 | 84.55 | 88 |
| Contrast example 2 | 270.6 | 76.9 | 82 |

As can be seen from Table 2, the electrochemical performance of contrast example 1 is somewhat worse than that of the examples, which is due to the generation of lumpy or foamy carbon during the preparation process, the defects caused to the powder during the crushing treatment, and the increase in the specific surface area of the prepared hard carbon product leading to the increase in the SEI film, which leads to a decrease in the specific capacity and first efficiency. In contrast example 2, the sample was carbonized directly without pre-oxidation treatment, which lacked sodium ion storage active sites and defects were not effectively repaired compared to the pre-oxidized material, resulting in a significant decrease in specific capacity, first efficiency and cycling performance.

The examples of the present application are described in detail above in conjunction with the accompanying drawings, but the present application is not limited to the above examples, and various variations can be made within the scope of knowledge possessed by a person of ordinary skill in the art to which they belong without departing from the purpose of the present application. In addition, the examples of the present application and the features in the examples can be combined with each other without conflict.

The invention claimed is:

1. A method of preparing a hard carbon anode material, comprising the following steps:
    S1: mixing starch with nano-silica, and performing heat treatment on the obtained mixture at 150° C. to 240° C. under an inert atmosphere to obtain a first-sintered product;
    S2: performing heat treatment on the first-sintered product at 180° C. to 220° C. under an oxygen-containing atmosphere to obtain a second-sintered product;
    S3: cyclonically separating the second-sintered product to remove the nano-silica, to obtain pre-oxidized starch-based microspheres; and
    S4: performing carbonization treatment on the pre-oxidized starch-based microspheres under an inert atmosphere to obtain the hard carbon anode material.

2. The preparation method according to claim 1, wherein, in step S1, the starch has a particle size of 2 μm to 80 μm, and the nano-silica has a particle size of 5 nm to 50 nm.

3. The preparation method according to claim 1, wherein, in step S1, a mass ratio of the starch to the nano-silica is 100:(0.5-10).

4. The preparation method according to claim 1, wherein, in step S1, the heat treatment is performed for 3 h to 20 h.

5. The preparation method according to claim 1, wherein the heat treatment in step S2 is: placing the first-sintered product in a reaction device, introducing oxygen-containing gas to purge for 30 min to 120 min, and then heating up to a target temperature for heat treatment.

6. The preparation method according to claim 1, wherein, in step S2, the heat treatment is performed for 4 h to 24 h.

7. The preparation method according to claim 1, wherein, in step S3, the pre-oxidized starch-based microspheres obtained after the cyclone separation are cyclonically separated again, and the cyclone separation is repeated 2 times to 8 times according to the above process.

8. The preparation method according to claim 1, wherein, in step S4, the carbonization treatment is performed at a temperature of 1000° C. to 1600° C.

9. The preparation method according to claim 1, wherein, in step S4, the carbonization treatment is performed for 1 h to 5 h.

* * * * *